UNITED STATES PATENT OFFICE.

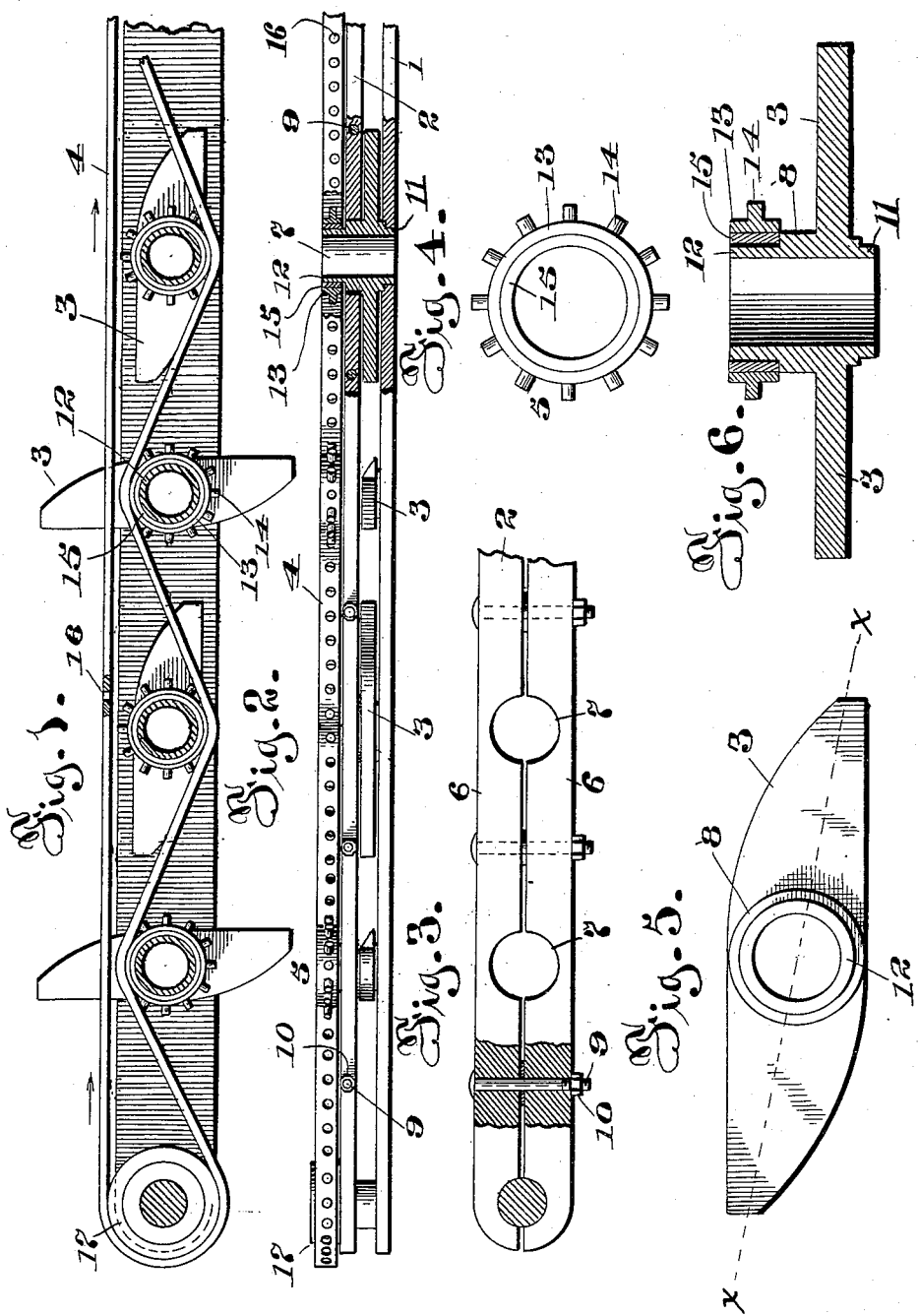

THOMAS H. POLLOCK, OF OMAHA, NEBRASKA.

CUTTER FOR MOWERS OR HARVESTERS.

SPECIFICATION forming part of Letters Patent No. 640,537, dated January 2, 1900.

Application filed May 22, 1899. Serial No. 717,761. (No model.)

*To all whom it may concern:*

Be it known that I, THOMAS H. POLLOCK, a citizen of the United States, residing at Omaha, in the county of Douglas and State of Nebraska, have invented certain new and useful Improvements in Cutters for Mowers or Harvesters; and I do hereby declare the following to be a full, clear, and exact description of the invention, such as will enable others skilled in the art to which it appertains to make and use the same.

My invention relates to mowers, and particularly to the cutting mechanism thereof, whether said mowers are operated by hand or by horse-power; and the invention consists of certain novel constructions, combinations, and arrangements of parts, as will be hereinafter described and specifically claimed.

In the accompanying drawings, Figure 1 is a plan view of my improved cutting mechanism, showing the upper bar removed. Fig. 2 is a side elevation of the same, partly in section. Fig. 3 is a top plan view of the upper bar, partly in section, the cutting-knives not being shown. Fig. 4 is a top plan view of the pin-wheel which engages the belt for operating the cutters. Fig. 5 is a top plan view of one of the cutters, and Fig. 6 is a vertical section through one of the cutters on the line $x\ x$ of Fig. 5.

1 in the drawings represents the lower bar; 2, the upper spaced bar; 3, the cutters; 4, the operating-belt, and 5 the pin-wheel.

The lower bar 1 and the upper bar 2 constitute the supporting means for the cutters, the cutters being journaled in the lower bar and extending beneath the upper bar 2, as clearly shown in Fig. 2. The upper bar 2 is made in two longitudinal sections 6 6, each of which is formed with semicircular apertures 7, which when brought together, as shown in Fig. 3, produce a circular aperture for the passage of the hubs or extensions 8, formed on the cutters 3. The bars 6 6 are made, preferably, of phosphor-bronze and are provided with laterally-extending openings, through which bolts 9 are passed, the latter being formed with screw-threads, on which nuts 10 are applied, the said bars being held apart at the proper distance by means of shims. By making the upper bar in two sections said sections can be adjusted to take up any wear which has taken place around the hubs 8 of the cutters 3, so that the parts will always be held tightly together and there will be no loosening or rattling.

The cutters 3 are made preferably of tool-steel perfectly ground to a shear edge and are turned up so as to give a shear cut. The cutters, as shown in Fig. 6, are formed with the upwardly-extending hub portion 8 and a downwardly-extending hub portion 11, the hub portion 11 being journaled in the lower bar 1 and the hub portion 8 extending through the upper bar 2, as heretofore described and as clearly shown in Fig. 2. The hub or extension 8 is reduced at its upper end, as at 12, and has applied on it the pin-ring 5, said pin-ring being forced down upon the cutter until it reaches the enlarged portion 8, so that it forms a part of and turns with the cutter.

The pin-ring is formed in the following manner: It consists of a ring 13, the ring, which may be cut from a hard piece of tubing, being drilled and countersunk from the back or inside, and the pins 14 are inserted therethrough, after which it is forced onto a ring 15 by means of hydraulic pressure, thus producing a cheap and efficient pinion, through which power may be transmitted by the belt 4, which latter is provided with apertures 16, as clearly shown in Fig. 2, which latter engage the pins 14 for that purpose.

The belt 4 is constructed, preferably, of rawhide and is provided at short intervals with the perforations 16, so that a very rapid movement may be imparted to the cutters. The belt is arranged on the supporting-bar in such a manner as to engage the alternate pin-wheels on the same side, or, in other words, engage the adjoining pin-wheels on opposite sides, so that the adjacent cutters 3 will all turn in opposite directions and will all shear in the same direction. The length of each cutter is sufficient to extend beyond a point equidistant between the pivot-points of two cutters, so that when the cutters are revolving rapidly they will cut all the grain or grass over which the machine passes and not leave lines or portions of the grain or grass uncut. Any number of cutters may be employed at the ends of the supporting-bars. The belt may pass around the pin-wheels or around an idler, as 17, and thence back to the driver, which is connected directly to the machine.

The whole device may be incased in a metal casing (not shown) which would extend as far forward as to the edge of each of the pin-wheels, thereby making a dust-tight housing.

The cutting mechanism thus described when applied to a mower or harvester would be driven by the ordinary gearing with the addition of a planet-gear which would operate the pin-wheels. It is also apparent that this form of cutting mechanism might be applied to hand lawn-mowers very successfully. The hubs or extensions on the cutters are left open at top and bottom, so as to permit sand and other matter to fall through instead of accumulating, which would be the case if the bottoms were closed.

Having now described my invention, what I claim as new, and desire to secure by Letters Patent, is—

1. A cutting mechanism for a mower or harvester, comprising in its construction a supporting-frame, comprising an upper and a lower bar, said upper bar being divisible longitudinally and the sections thereof being adjustable toward each other, a plurality of independent cutters or knives journaled to operate horizontally between the bars and means for revolving the adjacent cutters in opposite directions, substantially as described.

2. A cutting mechanism for mowers and harvesters, comprising in its construction a supporting-frame consisting of an upper and lower bar, the upper bar being divisible longitudinally and the sections thereof being adjustable toward each other, a plurality of cutters or knives arranged to operate horizontally between the bars and to overlap each other in the cutting operation, which cutters are formed with a hub or extension upon the upper end of which are provided a pin-wheel and a perforated belt which engages the pin-wheels on opposite sides so as to cause the adjacent cutters to revolve in opposite directions.

In testimony whereof I hereunto affix my signature in presence of two witnesses.

THOMAS H. POLLOCK.

Witnesses:
HOWARD K. CLOVER,
H. E. FREDRICKSON.